(12) United States Patent
de Ruijter et al.

(10) Patent No.: US 10,720,948 B2
(45) Date of Patent: *Jul. 21, 2020

(54) TRANSCEIVER WITH FREQUENCY ERROR COMPENSATION

(71) Applicant: Silicon Laboratories Inc., Austin, TX (US)

(72) Inventors: Hendricus de Ruijter, Austin, TX (US); Ping Xiong, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,055

(22) Filed: May 13, 2019

(65) Prior Publication Data

US 2019/0268031 A1     Aug. 29, 2019

Related U.S. Application Data

(62) Division of application No. 15/859,894, filed on Jan. 2, 2018, now Pat. No. 10,312,955.

(51) Int. Cl.
*H04B 1/02* (2006.01)
*H04B 1/10* (2006.01)
(Continued)

(52) U.S. Cl.
CPC .............. *H04B 1/1036* (2013.01); *H04B 1/38* (2013.01); *H04L 27/265* (2013.01);
(Continued)

(58) Field of Classification Search
CPC ........ H04B 1/1036; H04B 1/38; H04B 1/713; H04B 2201/694; H04L 27/2657;
(Continued)

(56) References Cited

U.S. PATENT DOCUMENTS 7,257,165 B2     8/2007  Gardner
10,312,955 B1 *  6/2019  de Ruijter ........... H04L 27/2675
(Continued)

OTHER PUBLICATIONS

Der, L., "Frequency Modulation (FM) Tutorial," Silicon Laboratories Inc., downloaded from https://www.silabs.com/products/audio-and-radio/frequency-modulation-fm-tutorial, Dec. 6, 2017, 11 pages.
(Continued)

*Primary Examiner* — Siu M Lee
(74) *Attorney, Agent, or Firm* — Zagorin Cave LLP

(57) ABSTRACT

A method for operating a communications system includes transmitting a preamble sequence including a plurality of tones. Each tone of the plurality of tones has a first characteristic and a second characteristic. The first characteristic of each of the tones of the plurality of tones has a predetermined relative relationship to the first characteristic of each of the other tones of the plurality of tones and the second characteristic of each of the tones of the plurality of tones has a predetermined relative relationship to the second characteristic of each of the other tones of the plurality of tones. The first and second characteristics may include relative power and relative phase.

20 Claims, 7 Drawing Sheets

(51) Int. Cl.
  *H04B 1/38* (2015.01)
  *H04L 27/26* (2006.01)
  *H04B 1/713* (2011.01)
  *H04L 12/28* (2006.01)

(52) U.S. Cl.
  CPC ...... *H04L 27/2657* (2013.01); *H04L 27/2672* (2013.01); *H04L 27/2675* (2013.01); *H04B 1/713* (2013.01); *H04B 2201/694* (2013.01); *H04L 12/28* (2013.01)

(58) Field of Classification Search
  CPC ............. H04L 27/2675; H04L 27/2672; H04L 27/265; H04L 12/28
  See application file for complete search history.

(56) References Cited

U.S. PATENT DOCUMENTS

| 2007/0002981 | A1 | 1/2007 | Gaikwad |
| 2007/0268976 | A1 | 11/2007 | Brink |
| 2008/0043858 | A1* | 2/2008 | Lim ........................ H04J 11/00 375/260 |
| 2008/0130779 | A1 | 6/2008 | Levi et al. |
| 2012/0163426 | A1 | 6/2012 | Nemeth |
| 2014/0376535 | A1* | 12/2014 | Murakami ............. H04B 7/024 370/338 |
| 2016/0127056 | A1* | 5/2016 | Soman ..................... H04B 3/54 370/463 |
| 2017/0195151 | A1 | 7/2017 | Chu |
| 2017/0310516 | A1* | 10/2017 | Lee ..................... H04L 27/2613 |

OTHER PUBLICATIONS

Natali, F., "AFC Tracking Algorithms," IEEE Transactions on Communications, vol. Com-32, No. 8, Aug. 1984, pp. 935-947.
Nine, J. and Boudaud, S., "LPWAN as Enabler for Widespread Geolocation Solutions," EmbeddedWorld2017 Exhibition and Conference, Mar. 2017, 8 pages.

* cited by examiner

TRANSCEIVER WITH FREQUENCY ERROR COMPENSATION

CROSS-REFERENCE TO RELATED APPLICATION(S)

This application is a divisional of U.S. patent application Ser. No. 15/859,894, filed Jan. 2, 2018, entitled "Transceiver with Frequency Error Compensation," naming Hendricus de Ruijter and Ping Xiong as inventors, which application is incorporated herein by reference.

BACKGROUND

Field of the Invention

The invention relates to communications systems, and more particularly, to frequency error compensation in communications systems.

Description of the Related Art

In general, Low Power Wide Area Networks (LPWANs) provide long range communications at low bit rates and have higher link budgets than other network types, e.g., Wireless Local Area Networks and Personal Area Networks. To realize a communications system with a large link budget, LPWANs implement a low data rate (e.g., 100 to 1000 bps), which improves receive sensitivity. To compensate for crystal frequency tolerance, both transmitters and receivers of transceivers use either spread spectrum modulation or a narrowband signal combined with a fine frequency acquisition and compensation.

Typical LPWANs based on wideband spread spectrum can be inherently tolerant to frequency errors. For systems with large spreading factors, a demodulator operates over a wide frequency spectrum, which may include the frequency error, which allows the receiver to detect and compensate for the error. However, that technique is associated with computational complexity that increases amounts of associated hardware that must operate with a low signal-to-noise ratio, thus increasing die area and power consumption. For example, those systems require long correlators (e.g., to filter the signal and attenuate the noise). In addition, wideband spread spectrum techniques may exhibit poor spectral efficiency, i.e., wideband spread spectrum signals need a high spectral bandwidth relative to their effective data rate, which may limit the network capacity due to limited spectrum availability.

Although typical LPWANs based on narrowband modulation benefit from high spectral efficiency, their receivers are intolerant to frequency errors since their narrowband channel filters attenuate the signal power when a frequency error positions the signal outside of the passband of the narrowband channel filter. Increasing the channel filter bandwidth increases tolerance of the receiver to frequency error, but that increased tolerance is achieved at the expense of decreased receiver sensitivity, which is undesirable in LPWANs.

Conventional frequency error detection techniques are slow, prone to generating false positives (e.g., by detecting the frequency error of an interfering signal or noise component), require long preambles to settle, and may degrade the receiver sensitivity. For example, an automatic frequency control loop measures frequency offset using a fast-Fourier transform and power measurement for all frequency bins of the received signal spectrum. The automatic frequency control technique estimates the frequency offset based on the power measurement, which is prone to errors, especially in the presence of interference that may be present when operating in unlicensed spectrum. Another conventional frequency error detection technique increases the bandwidth of a channel filter in the receiver to allow detection of the frequency error by the receiver. The increase in bandwidth of the channel filter increases the noise seen by the demodulator and a frequency error detector in the receiver, thus degrading receiver sensitivity. Accordingly, improved techniques for frequency acquisition in narrowband LPWANs are desired.

SUMMARY OF EMBODIMENTS OF THE INVENTION

In at least one embodiment, a method for operating a communications system includes transmitting a preamble sequence including a plurality of tones. Each tone of the plurality of tones has a first characteristic and a second characteristic. The first characteristic of each of the tones of the plurality of tones has a predetermined relative relationship to the first characteristic of each of the other tones of the plurality of tones and the second characteristic of each of the tones of the plurality of tones has a predetermined relative relationship to the second characteristic of each of the other tones of the plurality of tones. The first and second characteristics may include relative power and relative phase.

In at least one embodiment, a communications system includes a transmitter configured to generate a preamble sequence including a plurality of tones. Each tone of the plurality of tones has a first characteristic and a second characteristic. The first characteristic of each of the tones of the plurality of tones has a predetermined relative relationship to the first characteristic of each of the other tones of the plurality of tones and the second characteristic of each of the tones of the plurality of tones has a predetermined relative relationship to the second characteristic of each of the other tones of the plurality of tones. The communications system includes an antenna configured to transmit the preamble sequence.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
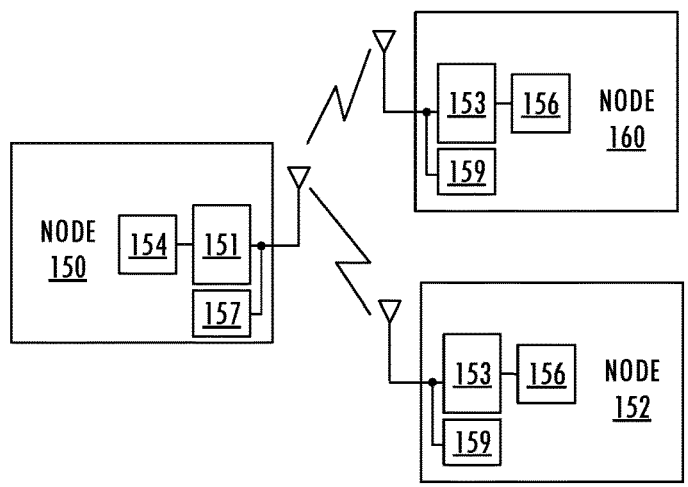
FIG. 1 illustrates a functional block diagram of a narrowband LPWAN.

A frequency error compensation technique for a narrowband LPWAN has improved spectral efficiency and reduced computational complexity as compared to frequency error compensation for wideband LPWAN systems (i.e., systems where the wideband spectrum is much greater than the data rate). In general, false signal detection may occur if the frequency error detection circuit decides that noise or interference is a valid signal. False signal detection may cause erroneous frequency estimates that could cause incorrect frequency error compensation and erroneous receipt of the transmitted packet. The frequency error compensation technique reduces false signal detection, while maintaining a high detection sensitivity and a fast detection period. The frequency error compensation technique includes processing steps that reduce or eliminate false positives to maintain correct signal detection even when operating under noisy and interference conditions. The fast detection period allows use of a short frequency lock preamble, which reduces power consumption and reduces impact on network capacity.

Referring to FIGS. 1-4, node 150 uses a transceiver (i.e., transmitter 157 and receiver 151) to communicate narrowband packets over the air with node 152, which includes a transceiver (i.e., transmitter 159 and receiver 153). A receiver uses frequency lock preamble 202 to detect a valid signal and measure the frequency offset, which is used to apply frequency error compensation to node 150 and to node 152. Receiver 151 or receiver 153 first applies a wideband channel filter having passband 302 (e.g., 80 kilo-Hertz (kHz)) and then applies a narrowband channel filter having passband 304 (e.g., 200 Hertz (Hz)). Oscillator 154 of node 150 and oscillator 156 of node 152 may be standard crystal oscillators, which each have a frequency error of approximately 18 parts per million (ppm). Thus, the frequency error of the received signal, which is communicated in an exemplary 915 MHz frequency band, is approximately +/−33 kHz, which is much greater than the bandwidth of the narrowband signal (e.g., less than 200 Hz). The frequency error between oscillator 154 of node 150 and oscillator 156 of node 152 causes receiver 153 to receive the signal in frequency band 306, which is outside the passband 304 of the narrowband channel filter.

A frequency error compensation technique uses an exemplary narrowband packet that includes frequency lock preamble 202. Frequency lock preamble 202 is transmitted prior to conventional portions of a narrowband packet consistent with a communications protocol (e.g., a physical layer convergence procedure protocol data unit (PPDU) including a synchronization header 204, which may include a preamble and synchronization word). Synchronization header 204 is followed by a physical layer (PHY) header 206, and PHY payload 208, generated using offset quadrature phase-shift keying (O-PSK) or other digital modulation technique. The frequency error compensation technique processes the spectrum within passband 302 to detect frequency lock preamble 202 (102). If the receiver does not detect frequency lock preamble 202 (104), the receiver continues processing received signals until it detects a valid frequency lock preamble 202. If receiver 153 detects a valid frequency lock preamble (104), then receiver 153 estimates a center frequency of the signal and adjusts receiver parameters to position the narrowband signal in frequency band 308 at the center of passband 304 of the narrowband channel filter (106). By positioning the narrowband signal in the center of the passband 304 of the narrowband channel filter, the narrowband filter may be designed to obtain high signal sensitivity, regardless of the frequency error, if the frequency error is contained within passband 302.

After receiver 153 compensates the frequency error, the receiver operates in a substantially conventional way (108). For example, the receiver may detect a conventional packet preamble, find symbol timing, find a start of the payload, and demodulate the payload. In at least one embodiment, receiver 153 performs automatic frequency error compensation to track and compensate for frequency drift in the crystal oscillators (in both a transmitter and a receiver) during the packet, which may affect signal recovery in very narrow bandwidth signals (110). Note that the conventional packet preamble may use a different modulation technique (e.g., offset quadrature phase-shift keying (O-QPSK), orthogonal frequency-division multiplexing (OFDM), on-off keying (OOK), etc.) and modulation parameters from the modulation parameters of frequency lock preamble 202, e.g. different modulation rate, deviation, and/or symbol pattern. By not limiting frequency lock preamble 202 to the modulation parameters of the conventional packet preamble, frequency lock preamble 202 can use parameters tailored for frequency error compensation, without limiting other aspects of receiver 153. For example, the narrowband channel filter and the demodulator can be tailored for signal sensitivity by using techniques such as coherent detection, Forward Error Correction (FEC), and interleaving.

The frequency error compensation technique includes transmitting a frequency lock preamble by a transmitting node and performing a fast-Fourier transform and post processing of a received signal in a receive node. The frequency lock preamble can be any type of modulated signal having a spectrum with distinct characteristics in terms of magnitude, phase, and frequency, subject to specified design criteria (e.g., frequency or phase modulation could be used or a combination of separate tones could be added to form the modulated signal as frequency lock preamble 202). For example, frequency modulation with a sinewave of the frequency lock preamble creates spectral tones spaced apart in frequency as determined by the modulation frequency $f_m$. As a result, the frequency lock preamble has distinct frequency spacing. In addition to the distinct frequency spacing, the frequency lock preamble has spectral tones with distinct relative magnitudes and phases. The magnitudes can be specified to have a predetermined ratio, and the phase difference between carrier $J_0$ and upper side tone $J_1$ can be specified to have the same phase when measured using the frequency domain signal output of an FFT, with no noise present. For example, lower side tone $J_1$ has a phase opposite to the phase of carrier $J_0$ and opposite to the phase of upper side tone $J_1$ (i.e., a rotation by $\pi$ radians).

Contrary to power detection used by automatic frequency control techniques described above, the frequency error compensation technique uses additional properties of the frequency lock preamble to detect the frequency lock preamble. By using multiple properties of the frequency lock preamble, post processing distinguishes the frequency lock preamble from noise and interference, thereby reducing false positives and improving the robustness of the frequency error compensation technique in the presence of noise and interference.

Figure 5:
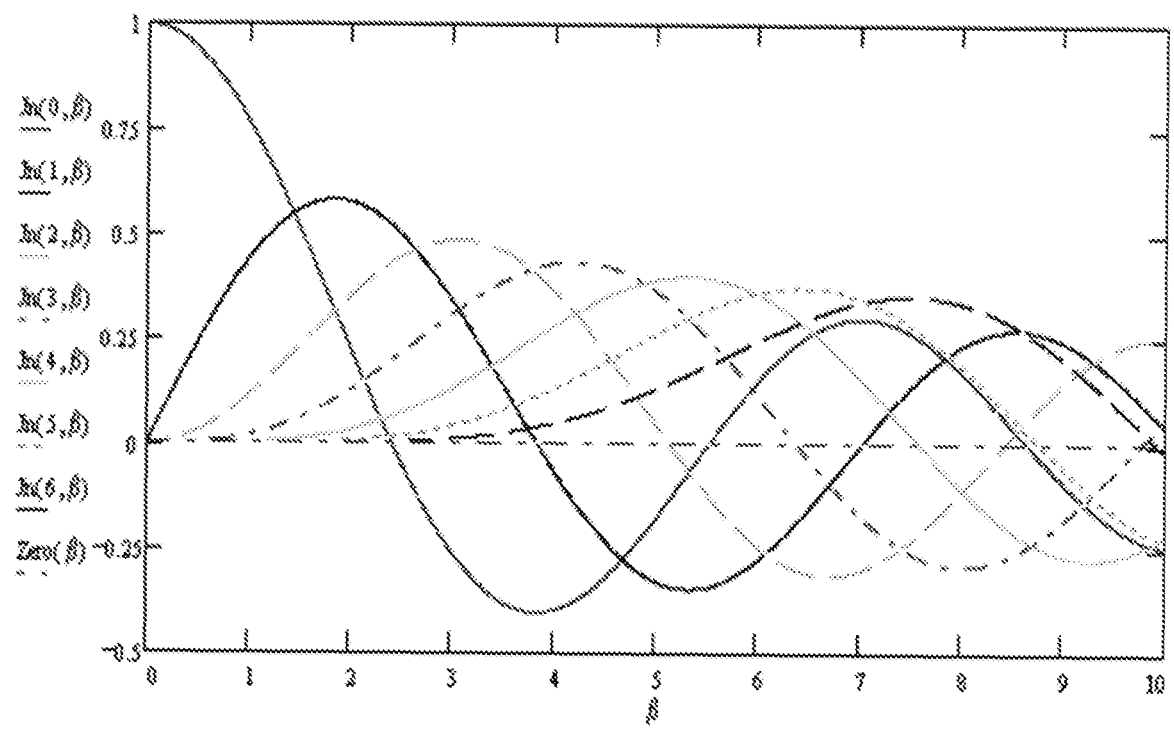
FIG. 5 illustrates an exemplary Bessel function for a frequency modulated signal.
Figure 6:
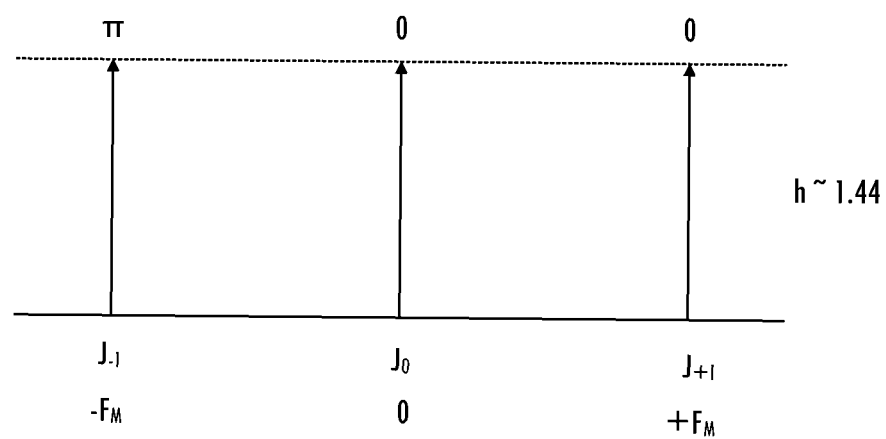
FIG. 6 illustrates an exemplary frequency domain representation of a frequency lock preamble for transmission consistent with at least one embodiment of the invention.

Referring to FIGS. 5 and 6, in at least one embodiment, the frequency lock preamble 202 is a frequency modulated (FM) signal that may be approximated as:

$$S\{t\}=AJ_0\{\beta\}\cos\{2\pi f_c t\}+A\Sigma_{k=0}^{\infty}J_{(2k+1)}\{\beta\}[\cos\{2\pi(f_c+(2k+1)f_m)t\}-\cos\{2\pi(f_c-(2k+1)f_m)t\}]+A\Sigma_{k=1}^{\infty}J_{2k}\{\beta\}[\sin\{2\pi(f_c+2kf_m)t\}-\sin\{2\pi(f_c-2kf_m)t\}],$$

where $\beta$ is the modulation index, $J(\beta)$ is the Bessel function, $f_m$ is the modulation frequency, $f_c$ is the carrier frequency, k is the integer order of the Bessel function, and t is time. In general, the Bessel function represents the harmonic distribution of a sine wave carrier having carrier frequency $f_c$ modulated by a sinusoidal signal having modulation frequency $f_m$ and provides the basis for a mathematical understanding of frequency modulation in the frequency domain. The frequency lock preamble is generated from multiple tones having predetermined relative frequencies, predetermined relative amplitudes, and predetermined relative phases. An exemplary frequency lock preamble uses three tones, lower side tone $J_{-1}$, carrier tone $J_0$, and upper side tone $J_{+1}$, having approximately equal magnitudes when a modulation index of 1.44 is used, and relative phases of $|\angle J_1 + \angle J_{-1} - 2 \times \angle J_0 - \pi| = 0$ radians for sinewave FM modulation. The plurality of tones includes lower side tone $J_{-1}$, carrier tone $J_0$, and upper side tone $J_{+1}$, where carrier tone $J_0$ has predetermined frequency $F_0$, predetermined amplitude A, and predetermined relative phase $\angle J_0$, lower side-tone $J_{-1}$ has frequency $F_0-F_M$, predetermined amplitude A, and predetermined relative phase $\angle J_{-1}$, and upper-side tone $J_1$ has a frequency $F_0+F_M$, predetermined amplitude A, and predetermined relative phase $\angle J_1$. Equalization of the multiple tones improves detectability over non-equalized tones. The modulation index indicates a maximum value of phase deviation for frequency modulation. Note that other embodiments of the frequency lock preamble use different numbers of tones, different modulation indexes, different tone equalization schemes, different relative frequencies, different relative phases, and different relative amplitudes. In at least one embodiment of the frequency error compensation technique, the mean additive white gaussian noise (AWGN) power at each frequency bin of the frequency domain signal is −173.8 dBm+10×log 10(16)+noise figure, where each frequency bin spans 16 Hz. The noise floor is one bin, e.g., approximately −155.8 dBm at a noise figure of 6. When the signal power is partitioned over three tones equal in magnitude, the signal power at one of three points (i.e., frequencies) is reduced by approximately −10×log 10(3) relative to the total transmit power. If signal power is approximately −139 dBm, then the signal power per tone is approximately −139-4.77 dBm, which results in a power of −143.77 dBm per tone, and a signal-to-noise ratio of approximately 12 dB for each tone. If signal power is approximately −144 dBm, then the signal-to-noise ratio is approximately 7 dB. In an exemplary embodiment, the frequency lock preamble includes three approximately equal tones spaced at 512 Hz apart (i.e., s(t)−cos(2$\pi f_c$t+$\beta$ sin(2$\pi f_m$t)), $J_{-1}$, $J_0$, $J_1$, of an FM signal where modulation frequency $F_M$=512 Hz) and $\angle J_1 + \angle J_{-1} - 2 \times \angle J_0 = \pi$ radians (where $\angle$ denotes angle).

Figure 7:
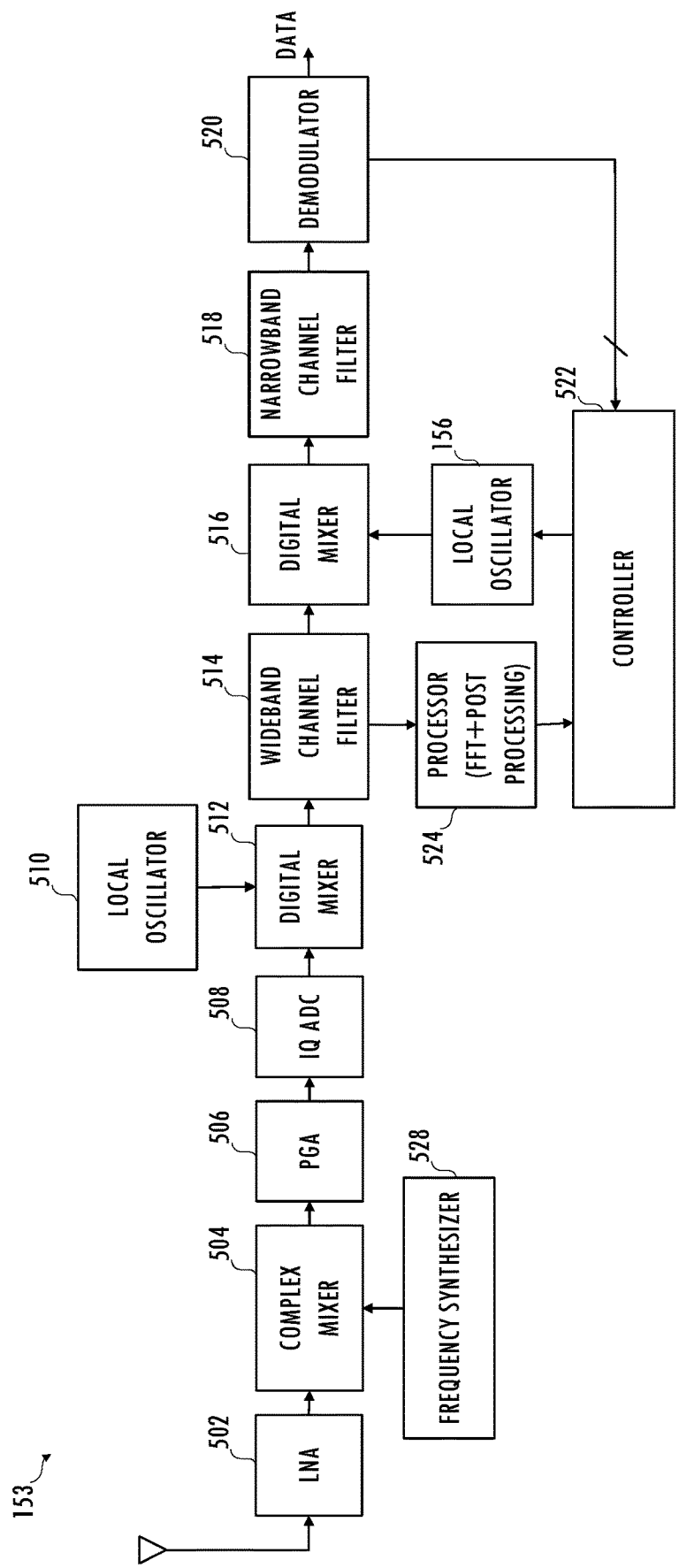
FIG. 7 illustrates an exemplary functional block diagram of an LPWAN receiver implementing frequency error compensation consistent with at least one embodiment of the invention.

Referring to FIG. 7, in at least one embodiment of the frequency error compensation technique, receiver 153 receives a wideband signal over the air using low-noise amplifier 502, complex mixer 504, programmable gain amplifier 506, frequency synthesizer 528, complex analog-to-digital converter 508, digital mixer 512 and local oscillator 510. Wideband channel filter 514 low pass filters a digital baseband signal and provides output quadrature signals to processor 524. After processor 524 converts the quadrature signals (i.e., the IQ signals at the output of wideband channel filter 514) into the frequency domain (e.g., using a fast-Fourier transform), processor 524 uses the following frequency lock preamble properties to detect the frequency lock preamble in the frequency domain signal: relative phase differences of the spectral components, relative frequency differences of the spectral components, power of the spectral components, and/or signal-to-noise ratio of the received signal.

In at least one embodiment, processor 524 includes application-specific digital hardware or a storage device (e.g., random access memory) and a data processor (e.g., a general-purpose processor, digital signal processor, or other data processor) or a combination thereof. In at least one embodiment, a general-purpose processor is coupled to a hardware accelerator, e.g., a fast-Fourier transform butterfly computation circuit or a Coordinate Rotation Digital Computer (CORDIC) and a multiply-and-add engine. In at least one embodiment, the LPWAN has a low data rate, allowing the processor and storage-device-based implementation to perform calculations serially, which reduces hardware requirements. For example, instead of using multiple fast-Fourier transform butterfly computation circuits, only one may be sufficient. Processor 524 may implement an exemplary $2^{12}$-point (i.e., N=$2^{12}$) fast Fourier transform for N-point data, which uses approximately n×log(n)=4096×12=C multiply-accumulate operations. Processor 524 may implement a $2^{15}$-point (i.e., N=$2^{15}$) fast Fourier transform for N-point data, which uses approximately n×log(n)=10×C multiply-accumulate operations. In another embodiment, processor 524 implements a $2^{12}$-point (i.e., N=$2^{12}$) fast Fourier transform over averaged data (e.g., stream into 8 N×1 vectors), which requires additional memory of 4096 complex data, 7×4096 complex data, and the fast Fourier transform uses C multiply-accumulate operations. Note that functions of controller 522 and processor 524 may be shared or combined in one or more resources.

Figure 9A:
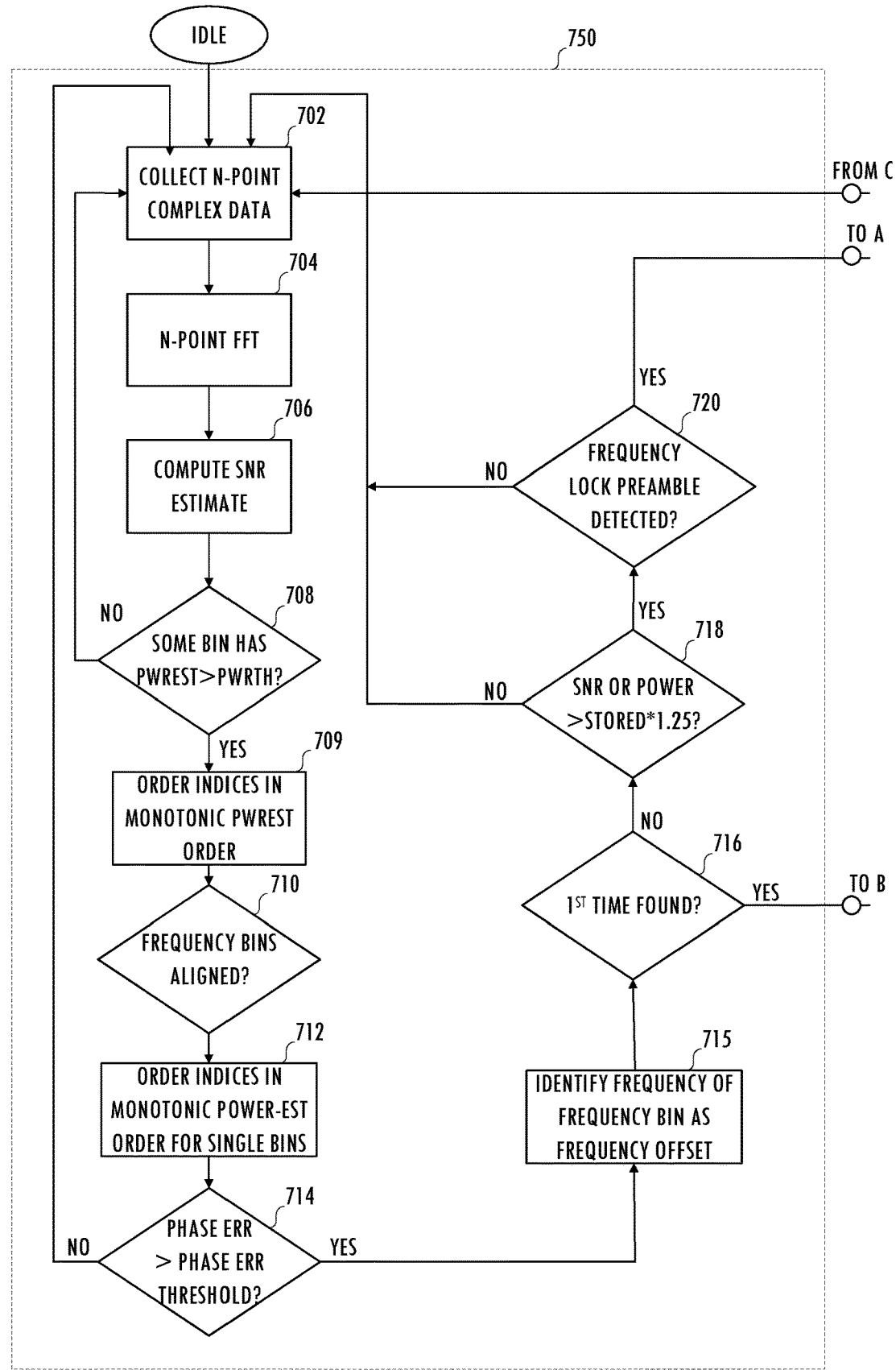
FIGS. 9A and 9B illustrate exemplary information and control flows for frequency error compensation of the LPWAN receivers of FIGS. 7 and 8 consistent with at least one embodiment of the invention The use of the same reference symbols in different drawings indicates similar or identical items.
Figure 9B:
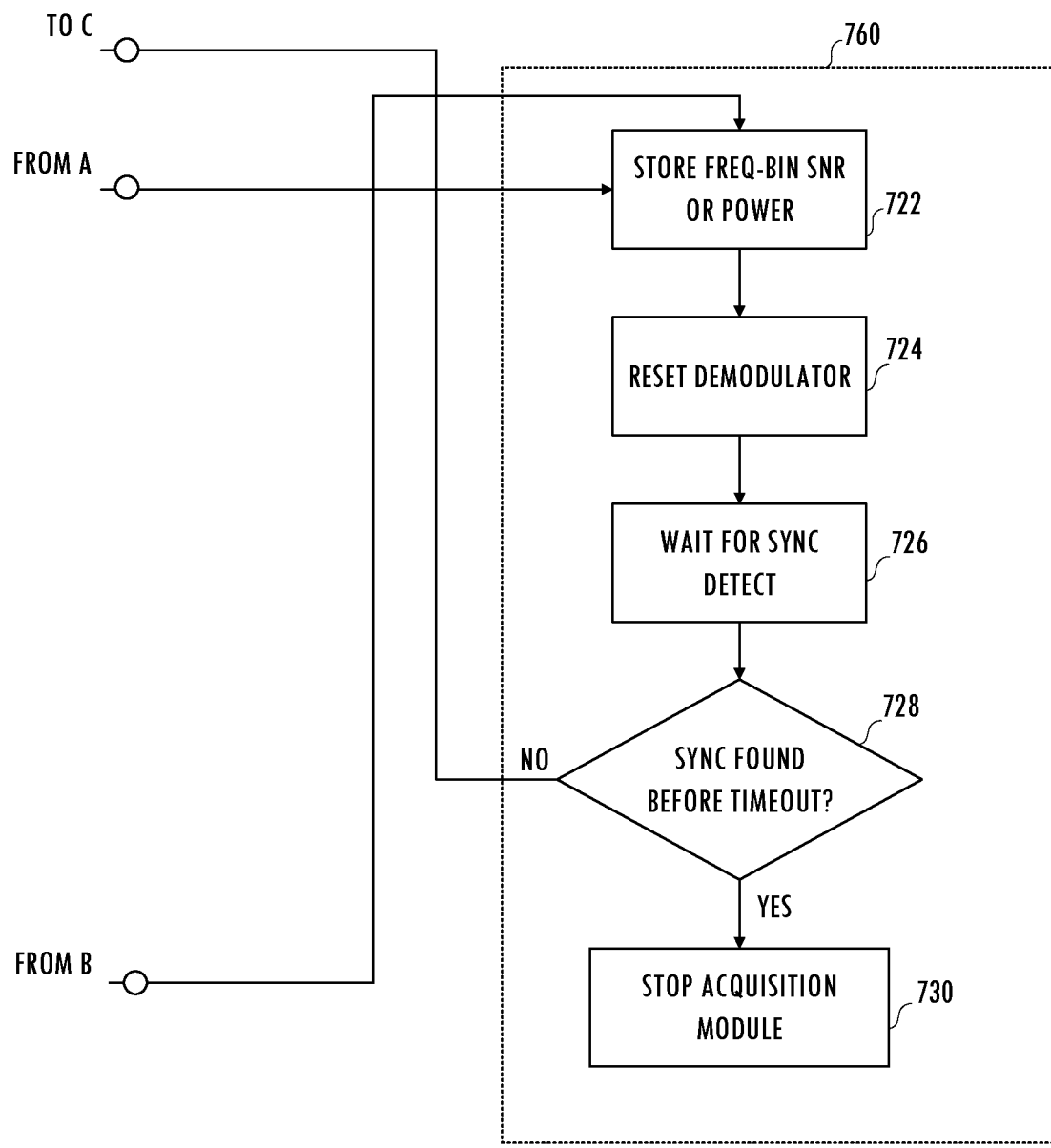

Referring to FIGS. 7, 9A and 9B, in at least one embodiment, processor 524 performs frequency error estimation (750). Processor 524 collects N-point complex data output from wideband channel filter 514 (702) and converts the N-point complex data from a time domain representation into a frequency domain signal, e.g., using a fast-Fourier transform (704). Processor 524 computes a power estimate, which may be an absolute power estimate, or a relative power estimate, e.g., a signal-to-noise ratio (706). In at least one embodiment, processor 524 generates the power estimates based on an assumption that signal energy is distributed across two adjacent frequency bins of the frequency domain signal (i.e., the signal frequencies and the frequency bins are misaligned). Accordingly, processor 524 computes the signal power as the sum power over lower side tone $J_{-1}$, carrier tone $J_0$, and upper side tone $J_1$, using pairs of adjacent frequency bins. The noise power per frequency bin of the frequency domain signal is computed as the mean of the sum of the power minus the signal power, from −2×$F_M$ to 2×$F_M$, excluding the edge bins. Processor 524 identifies all power estimates of the frequency domain signal that are greater than a predetermined threshold power estimate (708). If no frequency bins of the frequency domain signal have a power estimate that is greater than the predetermined threshold power estimate, then receiver 153 processes the next N-point complex data output from wideband channel filter 514 (702). If at least one frequency bin of the frequency domain signal has a power estimate that is greater than the predetermined threshold power estimate, then processor 524 orders all of the frequency bins that have a power estimate greater than the predetermined threshold power estimate monotonically with respect to the power estimates (709).

In at least one embodiment, processor 524 determines whether signal frequencies are aligned with the frequency bins of the frequency domain signal or the signal frequencies are distributed across two frequency bins of the frequency domain signal (710). To make this determination for a frequency lock preamble including only three tones, as described above, processor 524 compares power ratios of two adjacent frequency bins of the monotonically ordered frequency bins (i.e., those frequency bins having power estimates greater than the predetermined threshold power estimate). For a frequency lock preamble including only three tones, if two out of three sets of frequency bins have power ratios less than one-third or greater than three, then processor 524 considers the power to be dominant in one frequency bin of each set and processor 524 identifies an order of those frequency bins that is monotonic with respect to the power estimate for three single bins, instead of using pairs of adjacent frequency bins (712).

Processor 524 searches, from largest to smallest of the power estimates for all the frequency bins in the monotonic order, to identify a first frequency bin having a relative phase error less than a predetermined threshold phase error (e.g., 0.5×π) (714). The relative phase error for the frequency lock preamble described above is $|\angle J_1 + \angle J_{-1} - 2\times\angle J_0 - \pi|$ radians for each frequency bin. When the frequency bin and the signal frequency are misaligned, processor 524 accounts for frequencies occupying two frequency bins by calculating power estimates over two adjacent frequency bins and relative phase error as the smaller of the phases calculated for the two adjacent bins. Detection of the frequency bin having the largest power estimate greater than the predetermined threshold power estimate that also has a relative phase error less than a predetermined threshold phase error identifies the frequency lock preamble. Processor 524 determines that the frequency corresponding to that frequency bin is the frequency offset (715).

In at least one embodiment, processor 524 increases the robustness of frequency lock preamble detection against interference by incrementally adjusting the relative phase error threshold based on the power estimate (e.g., based on the estimated signal-to-noise ratio). For example, processor 524 initializes the phase error threshold to 100% of a predetermined relative phase error threshold. When the signal-to-noise ratio estimate is greater than two times the predetermined signal-to-noise ratio threshold and less than four times the predetermined signal-to-noise ratio threshold, then processor 524 sets the relative phase error threshold to 75% of the predetermined relative phase error threshold. When the signal-to-noise ratio estimate is greater than four times the predetermined signal-to-noise ratio threshold and less than eight times the predetermined signal-to-noise ratio threshold, then processor 524 sets the relative phase error threshold to 50% of the predetermined relative phase error threshold. When the signal-to-noise ratio estimate is greater than eight times the predetermined signal-to-noise ratio threshold, then processor 524 sets the relative phase error threshold to 25% of the predetermined relative phase error threshold. Note that the increments of the signal-to-noise ratio thresholds and corresponding relative phase error thresholds are exemplary only, and other values having different granularity may be used.

If processor 524 determines that the detection of the frequency lock preamble is the first detection of the frequency lock preamble during the corresponding dialog (716), then processor 524 uses the frequency offset to continue acquisition and synchronization (760). If the detection of the frequency lock preamble had already been detected during the corresponding dialog (716), then processor 524 determines whether this subsequent frequency lock preamble detection is more robust than detection of the prior-detected frequency lock preamble and should be used to continue acquisition and synchronization. For example, if the power estimate of the subsequent frequency lock preamble is a predetermined amount greater than a stored power estimate corresponding to the prior-detected frequency lock preamble (e.g., 1.25 times the stored signal-to-noise ratio or other power estimate) (718), then processor 524 determines whether receiver 153 has detected a preamble or other regular header portion (720). If no packet preamble was detected, processor 524 continues frequency estimation using the next N-point complex data output from wideband channel filter 514 (702).

If receiver 153 had detected the packet frequency lock preamble (720), then processor 524 stores the power estimate for the frequency bin (722) and the receiver aligns the narrowband filter to the center of the received signal, resets demodulator 520 (724) and waits for detection of a synchronization word or other indication of the end of the synchronization header (SHR) (726). If receiver 153 does not detect the end of the packet header with a predetermined period, receiver 153 times out (728) and processor 524 resumes frequency estimation using the next N-point complex data output from wideband channel filter 514 (702). If receiver 153 detects the end of the packet header within the predetermined period (728), receiver 153 disables acquisition mode by controller 522 (730). The previously identified frequency offset is used after detecting the frequency lock preamble to detect the synchronization header, the PHY header, and the PHY payload using the narrowband filter and to demodulate the payload. Note that the information and control flows of FIGS. 9A and 9B are exemplary only and other information and control flow sequences that maintain data dependencies are consistent with techniques described herein.

During normal receive operations, wideband channel filter 514 provides quadrature wideband signal output signals to digital mixer 516. Digital mixer 516 provides a frequency-shifted complex signal to narrowband channel filter 518. The bandwidth of narrowband channel filter 518 may be optimized for receive sensitivity. Local oscillator 156 provides a clock signal to digital mixer 516. Controller 522 tunes the frequency of local oscillator 156 according to the frequency error estimation provided by processor 524 such that the narrowband signal at the output of digital mixer 516 is aligned to the center frequency of narrowband channel filter 518. Narrowband channel filter 518 provides a narrowband signal to demodulator 520, which is configured to receive the synchronization header, the PHY header, and the PHY payload. In addition, controller 522 also derives symbol timing from a preamble, finds the start of the payload using a synchronization word, and tracks drift in the frequency offset based on the output of demodulator 520. Drift in the frequency offset may be compensated by providing feedback to local oscillator 156.

After processor 524 determines the frequency error, controller 522 engages demodulator 520. In at least one embodiment, processor 524 continues to perform a fast-Fourier transform and post processing while demodulator 520 is engaged. Accordingly, receiver 153 can recover quickly if demodulator 520 was engaged in response to processor 524 erroneously detecting a frequency lock preamble. For example, if controller 522 does not detect the preamble or sync word within a certain period after engaging demodulator 520, demodulator 520 can be aborted while processor 524 may already be processing a valid packet. Thus, the valid packet can still be received. If processor 524 is disabled while demodulator 520 is engaged, the valid packet could be missed.

Referring to FIG. 1, in at least one embodiment, node 150 is a base station that detects the frequency lock preambles transmitted by multiple end nodes concurrently and receiver 151 includes parallel receiver portions to concurrently receive communications from node 160 and node 152. Frequency error detection may be active during regular receiver operations so that a first packet from node 152 can be demodulated using regular receiver operations while receiver 151 also performs frequency error detection to search for a possible second packet from node 160.

Figure 8:
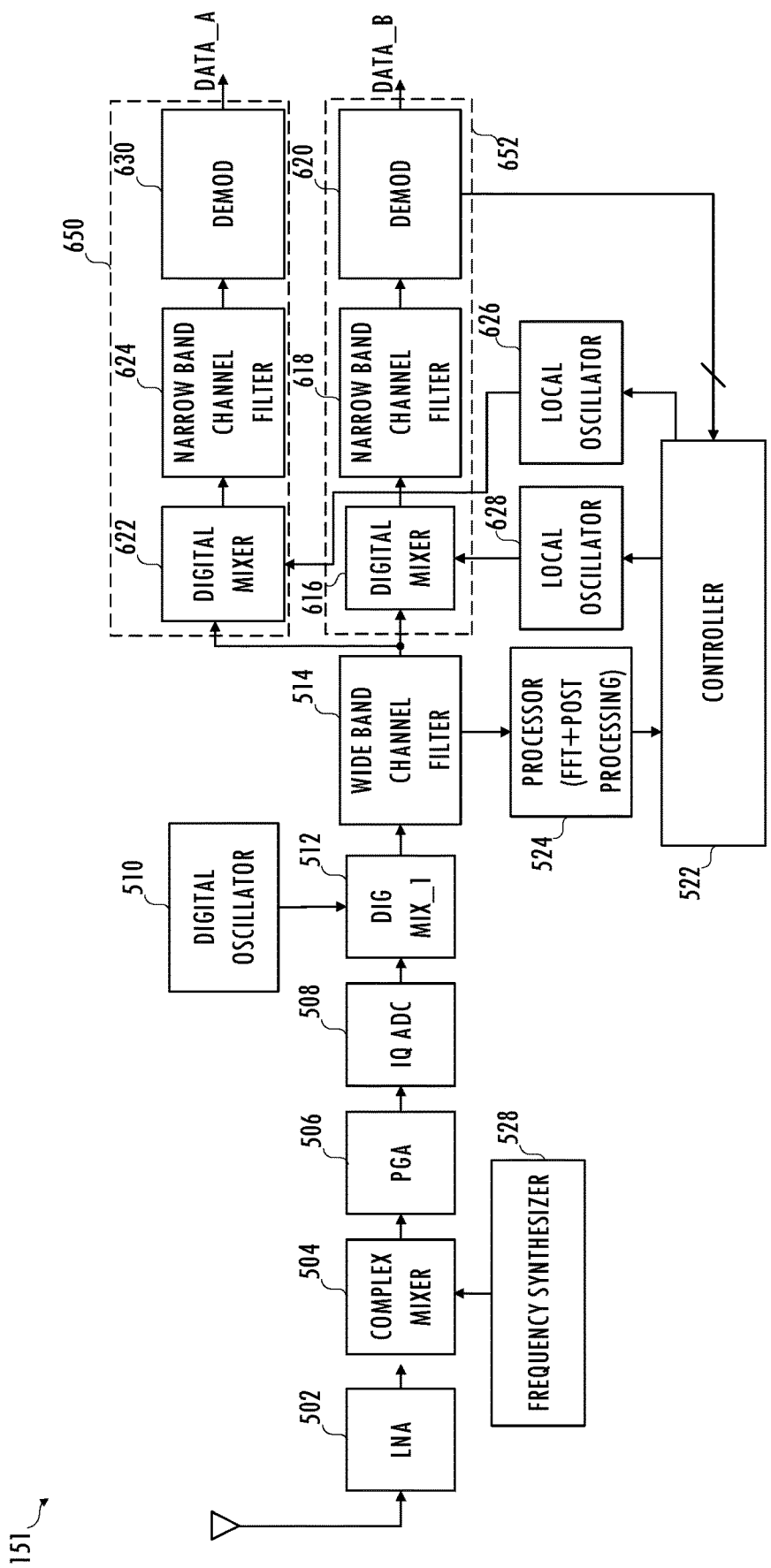
FIG. 8 illustrates an exemplary functional block diagram of a multi-channel LPWAN receiver including frequency error compensation consistent with at least one embodiment of the invention.

Referring to FIG. 8, in at least one embodiment, receiver 151 is included in a node (e.g., a base station) that concurrently detects a frequency lock preamble from each of multiple other nodes (e.g., other end nodes). Receiver 151 includes receiver portion 650 (e.g., digital mixer 622, narrowband channel filter 624, and demodulator 630) that operates in parallel with receiver portion 652 (e.g., digital mixer 616, narrowband channel filter 618, and demodulator 620) to concurrently recover data from at least one other communications received from more than one node. Receiver portion 650 and receiver portion 652 are coupled to corresponding oscillators (e.g., local oscillator 626 and local oscillator 628, respectively, which may be digitally-controlled oscillators providing corresponding signals having corresponding frequencies responsive to respective digital control words). Controller 522 compensates each of the corresponding oscillators separately for any corresponding frequency errors detected by processor 524. During regular receiver operations of receiver portion 650, receiver portion 652 may perform frequency error compensation. Packets from a first node can be demodulated using regular operations of receiver portion 650 while processor 524 performs frequency error detection and searches for an additional packet from a second node that can be demodulated using the receiver portion 652.

In general, narrowband LPWAN signals are prone to multipath fading. To compensate for multipath fading, the LPWAN may implement one or more diversity technique. In at least one embodiment, receiver 153 may be used in combination with frequency diversity techniques (e.g., frequency hopping) or spatial diversity techniques. Receiver 153 may be configured to operate in a nonsynchronous or synchronous mode. In nonsynchronous mode, receiver 153 does not know when a packet has been transmitted. In addition, it may not know which channel or RF frequency has been used to transmit a packet. To accommodate frequency diversity, receiver 153 scans channels of the received signal frequency spectrum to search for the frequency lock preamble, e.g. tune to one of the possible channels, convert one symbol from the time domain into the frequency domain representation and post process that one frequency domain signal. If receiver 153 does not detect a valid frequency lock preamble, receiver 153 tunes to a next possible channel and repeats the processing steps until receiver 153 detects a valid frequency lock preamble. After receiver 153 detects a valid frequency lock preamble, receiver 153 may receive details of the hopping scheme applied to successive transmissions and follows a synchronous hopping mode until the end of the communication. After receiver 153 first detects the frequency lock preamble, receiver 153 knows the frequency, including the frequencies of other channels used by the hopping scheme. Accordingly, receivers on both sides of the communication can ignore frequency lock preamble transmissions in successive packets. In an exemplary frequency hopping mode of operation, receiver 153 returns acknowledgement packets in response to the successfully received packets. Those acknowledgement packets may include data to support the link quality, e.g. a request to avoid a certain channel or to apply a small frequency shift in certain channels to reduce effects of interference.

In at least one embodiment, receiver 153 implements spatial diversity (e.g., includes multiple receiver antennas) to reduce effects of multipath fading. For example, receiver 153 uses switch diversity, which selects one antenna of multiple antennas coupled to receiver 153. If processor 524 does not detect a valid frequency lock preamble in a particular search period using the selected antenna, receiver 153 selects another antenna. Receiver 153 repeats antenna selection and search for a valid frequency lock preamble until receiver 153 detects a valid frequency lock preamble. In at least one embodiment, after detecting a first valid frequency lock preamble using the selected antenna, receiver 153 enables demodulator 520 or evaluates symbols received using other antennae to identify the antenna that provides the frequency lock preamble with the highest quality and then enables demodulator 520 to be responsive to symbols received using the identified antenna. In other embodiments, receiver 153 implements spatial diversity using conventional maximum ratio combining techniques, which may use the phase and amplitude measurements described above.

Figure 4:
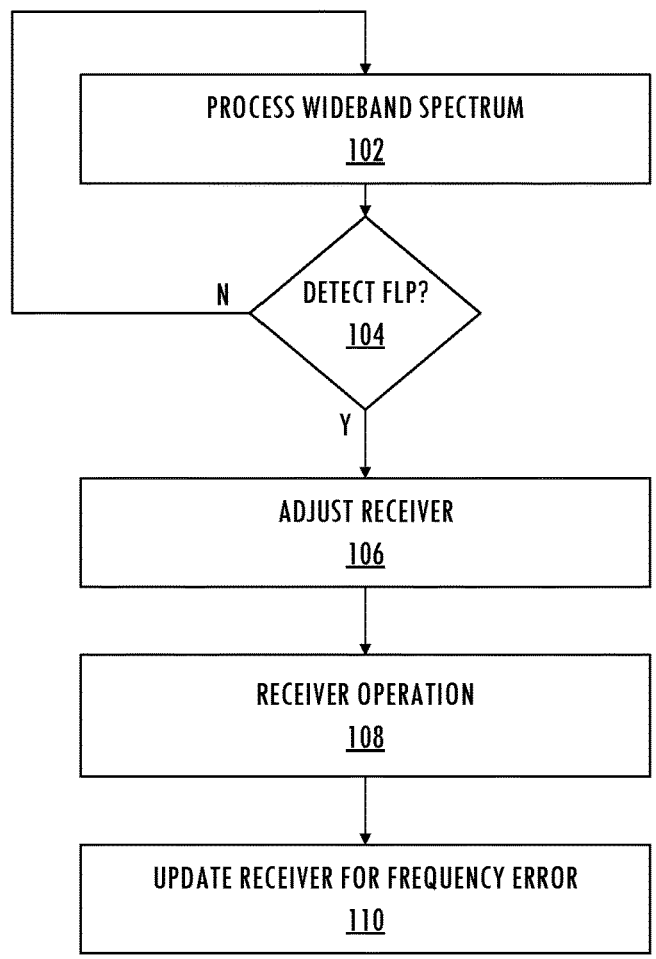
FIG. 4 illustrates information and control flows for frequency error compensation of the LPWAN of FIG. 1, consistent with at least one embodiment of the invention.
Figure 2:
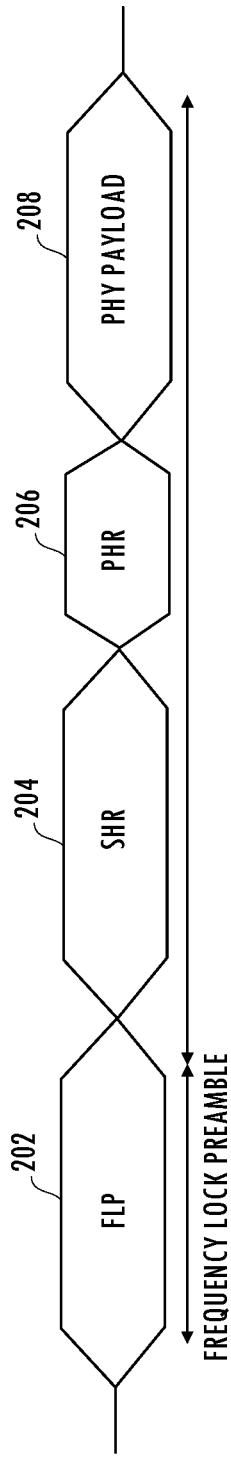
FIG. 2 illustrates an exemplary packet format including a frequency lock preamble consistent with at least one embodiment of the invention.
Figure 3:
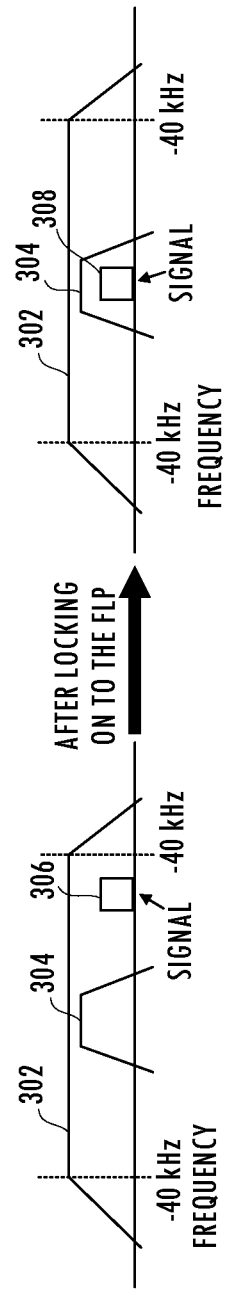
FIG. 3 illustrates an exemplary frequency spectrum of a wideband channel filter, a narrowband channel filter, and a received signal before and after frequency error compensation consistent with at least one embodiment of the invention.

To reduce system cost and power consumption, the frequency error detection techniques described herein may be implemented asymmetrically, e.g., end nodes may not include the frequency error detection provisions while a central node or a base station includes the frequency error detection provisions. Referring to FIGS. 1 and 4, in at least one embodiment, during an initial packet exchange, receiver 151 of node 150 (e.g., a base station) has no knowledge of the frequency error and processes the wideband spectrum (102). If receiver 151 detects a valid frequency lock preamble (104), receiver 151 estimates a center frequency of the signal and adjusts receiver parameters to position the narrowband signal in the center of the passband of the narrowband channel filter, as described above (106). However, in subsequent packets, that processing may be optional. For example, after receiver 151 receives a packet and determines the frequency error, transmitter 157 may send a response to node 152 (e.g., an end node) by transmitting on the same frequency as the frequency used by node 152 when node 152 initiated communication. Node 150 may respond using transmitter 157 to send an acknowledgement packet to node 152 without the frequency lock preamble. The frequency alignment of transmitter 157 allows a narrowband channel filter in node 152 without using a frequency lock preamble-based frequency compensation technique. Instead, node 152 may directly perform conventional receiver operations (108). Accordingly, node 150 and node 152 have reduced active time, thereby reducing system power consumption. In addition, one of the two nodes may have reduced cost since both nodes do not need to include the hardware and software related to frequency error detection.

Power consumption savings may be achieved by performing the frequency error detection technique once per dialog, where a dialog includes several packets exchanged between two nodes. In combination with the asymmetric network described above, e.g., an end node sends a service request packet including a frequency lock preamble to a base station, the base station will process the wideband spectrum (102), detect the frequency lock preamble (104), adjust the receiver to compensate for frequency error (106), and perform conventional receiver operations (108) to receive the service request. The base station uses the determined frequency error information to compensate the frequency error in a service grant reply to the end node without sending the frequency lock preamble, and the end node receives the service grant packet using conventional receiver operations. Then, the end node transmits its data to the base station without frequency lock preamble. The base station receives the data using conventional receiver operations (108), and applies the same frequency error compensation that was used during the reception of the service request. The base station may send an acknowledgement packet and the end node may transmit more data, until the dialog ends. In addition, a base station may also request that end nodes shift transmission frequencies to partition the available bandwidth evenly among the end nodes and to avoid interference from other networks. That frequency shift may improve the network capacity and coexistence with other networks.

Thus, techniques for frequency error compensation of a transceiver have been described. The description of the invention set forth herein is illustrative, and is not intended to limit the scope of the invention as set forth in the following claims. For example, while the invention has been described in an embodiment in which the frequency lock preamble includes three tones, one of skill in the art will appreciate that the teachings herein can be utilized with a frequency lock preamble having additional tones. In addition, although the invention has been described in an embodiment in which the frequency lock preamble is transmitted using frequency modulation, one of skill in the art will appreciate that the teachings herein can be utilized with other modulation techniques (e.g., orthogonal frequency division multiplexing modulation and a linear power amplifier). Furthermore, although the invention has been described in an embodiment without the use of spreading, in at least one embodiment, an LPWAN including frequency error compensation applies spreading. The spreading factor can be designed for target receive sensitivity, spectral usage, power, and die area specifications without considering frequency error, since the frequency error compensation technique separately handles frequency acquisition. Variations and modifications of the embodiments disclosed herein, may be made based on the description set forth herein, without departing from the scope of the invention as set forth in the following claims.

What is claimed is:

1. A method for operating a communications system comprising:
   transmitting a preamble sequence including a plurality of tones, each tone of the plurality of tones having a first characteristic and a second characteristic, wherein the first characteristic of each of the tones of the plurality of tones has a first predetermined relative relationship to the first characteristic of each of the other tones of the plurality of tones and the second characteristic of each of the tones of the plurality of tones has a second predetermined relative relationship to the second characteristic of each of the other tones of the plurality of tones.

2. The method, as recited in claim 1, wherein the first characteristic and the second characteristic include relative power and relative phase.

3. The method, as recited in claim 1, wherein the plurality of tones includes lower side tone $J_{-1}$, carrier tone $J_0$, and upper side tone $J_1$, carrier tone $J_0$ having predetermined relative frequency $F_0$, predetermined relative amplitude $A_0$, and predetermined relative phase $\angle J_0$, lower side tone $J_{-1}$ having frequency $F_0-F_M$, predetermined relative amplitude $A_{-1}$, and predetermined relative phase $\angle J_{-1}$, and upper side tone $J_1$ having frequency $F_0+F_M$, predetermined relative amplitude $A_1$, and predetermined relative phase $\angle J_1$, wherein $|\angle J_1 + \angle J_{-1} - 2\times\angle J_0 - \pi| = 0$ radians, where $F_M$ is a modulation frequency of the communications system.

4. The method, as recited in claim 1, further comprising:
   detecting the preamble sequence in a received signal, the preamble sequence being detected based on a plurality of power estimates corresponding to a plurality of frequency bins of a received frequency domain signal, a plurality of relative phase errors corresponding to the plurality of frequency bins of the received frequency domain signal, a threshold power estimate, and a threshold relative phase error.

5. The method, as recited in claim 4, wherein detecting the preamble sequence comprises:
   identifying first frequency bins of the plurality of frequency bins having corresponding power estimates above the threshold power estimate;
   identifying a first order of the first frequency bins, the first order having monotonic values of the power estimates corresponding to the first frequency bins; and
   identifying a frequency bin of the first order of the first frequency bins having a corresponding relative phase error below the threshold relative phase error.

6. The method, as recited in claim 4, further comprising:
   compensating for a frequency error in the communications system based on the frequency error being determined using the preamble sequence.

7. The method, as recited in claim 4, wherein detecting the preamble sequence comprises:
   wideband filtering the received signal to generate a wideband received signal; and
   generating the received frequency domain signal based on the wideband received signal.

8. The method, as recited in claim 7, further comprising:
   adjusting the communications system to cause a narrowband received signal to be positioned within a frequency band of a narrowband channel filter responsive to a frequency shifted version of the wideband received signal.

9. A communications system comprising:
   a transmitter configured to generate a preamble sequence including a plurality of tones, each tone of the plurality of tones having a first characteristic and a second characteristic, wherein the first characteristic of each of the tones of the plurality of tones has a first predetermined relative relationship to the first characteristic of each of the other tones of the plurality of tones and the second characteristic of each of the tones of the plurality of tones has a second predetermined relative relationship to the second characteristic of each of the other tones of the plurality of tones; and an antenna configured to transmit the preamble sequence.

10. The communications system, as recited in claim 9, wherein the first characteristic and the second characteristic include relative power and relative phase.

11. The communications system, as recited in claim 9, wherein the plurality of tones includes lower side tone $J_{-1}$, carrier tone $J_0$, and upper side tone $J_1$, carrier tone $J_0$ having predetermined relative frequency $F_0$, predetermined relative amplitude $A_0$, and predetermined relative phase $\angle J_0$, lower side tone $J_{-1}$ having frequency $F_0-F_M$, predetermined relative amplitude $A_{-1}$, and predetermined relative phase $\angle J_{-1}$, and upper side tone $J_1$ having frequency $F_0+F_M$, predetermined relative amplitude $A_1$, and predetermined relative phase $\angle J_1$, wherein $|\angle J_1+\angle J_{-1}-2\times\angle J_0-\pi|=0$ radians, where $F_M$ is a modulation frequency of the communications system.

12. The communications system, as recited in claim 9, further comprising:
 a receiver configured to detect the preamble sequence in a received signal, wherein the receiver comprises:
  a receiver signal path configured to provide a digital received signal based on the received signal and a control signal generated based on a frequency error indicator;
  a fast-Fourier transform circuit configured to generate a received frequency domain signal based on the digital received signal;
  a processor configured to detect a received preamble sequence in the received signal, the received preamble sequence being detected based on a plurality of power estimates corresponding to a plurality of frequency bins of the received frequency domain signal, a plurality of relative phase errors corresponding to the plurality of frequency bins of the received frequency domain signal, a threshold power estimate, and a threshold relative phase error; and
  generate the frequency error indicator using the received preamble sequence.

13. The communications system, as recited in claim 12, wherein the processor is further configured to:
 identify first frequency bins of the plurality of frequency bins having corresponding power estimates above the threshold power estimate;
 identify a first order of the first frequency bins, the first order having monotonic values of the power estimates corresponding to the first frequency bins; and
 identify a frequency bin of the first order of the first frequency bins having a corresponding relative phase error below the threshold relative phase error,
 wherein the processor determines a frequency error based on a frequency corresponding to the frequency bin.

14. The communications system, as recited in claim 13, wherein the processor is further configured to:
 generate the received frequency domain signal based on the received signal, the received frequency domain signal having the plurality of frequency bins; and
 determine whether each frequency of the received signal is represented by a pair of adjacent frequency bins of the plurality of frequency bins or by a single frequency bin of the plurality of frequency bins based on a comparison of power estimates of adjacent frequency bins.

15. The communications system, as recited in claim 14, wherein the processor is further configured to:
 generate each of the plurality of power estimates using two corresponding adjacent frequency bins; and in response to a determination that each frequency of the received signal is represented by a pair of adjacent frequency bins of the plurality of frequency bins based on the plurality of power estimates:
  identify the first order of the first frequency bins, and
  generate each of the plurality of relative phase errors using a smaller of phase errors between the corresponding frequency bin and each of two corresponding adjacent frequency bins.

16. The communications system, as recited in claim 12, further comprising:
 a controllable oscillator configured to generate a clock signal based on the frequency error indicator,
 wherein the receiver signal path comprises:
  a wideband channel filter configured to generate an output responsive to a version of the received signal;
  a digital mixer responsive to the output and the clock signal to generate a frequency-shifted version of the output;
  a narrowband channel filter configured to generate a narrowband received signal based on the frequency-shifted version of the output; and
  a demodulator configured to generate a recovered data signal based on the narrowband received signal.

17. The communications system, as recited in claim 12, wherein the processor comprises:
 a digital signal processor; and
 software stored in a storage element coupled to the digital signal processor, the software being executable by the digital signal processor to detect the received preamble sequence and generate the frequency error indicator.

18. An apparatus comprising:
 means for receiving a received signal; and
 means for generating an adjustment signal based on the received signal including a preamble sequence, the adjustment signal causing a narrowband received signal to be positioned within a frequency band of a narrowband channel filter responsive to a frequency shifted version of a wideband received signal.

19. The apparatus, as recited in claim 18, further comprising:
 means for transmitting the preamble sequence including a plurality of tones, each tone of the plurality of tones having a first characteristic and a second characteristic, wherein the first characteristic of each of the tones of the plurality of tones has a first predetermined relative relationship to the first characteristic of each of the other tones of the plurality of tones and the second characteristic of each of the tones of the plurality of tones has a second predetermined relative relationship to the second characteristic of each of the other tones of the plurality of tones.

20. The apparatus, as recited in claim 19, wherein the plurality of tones includes lower side tone $J_{-1}$, carrier tone $J_0$, and upper side tone $J_1$, carrier tone $J_0$ having predetermined relative frequency $F_0$, predetermined relative amplitude $A_0$, and predetermined relative phase $\angle J_0$, lower side tone $J_{-1}$ having frequency $F_0-F_M$, predetermined relative amplitude $A_{-1}$, and predetermined relative phase $\angle J_{-1}$, and upper side tone $J_1$ having frequency $F_0+F_M$, predetermined relative amplitude $A_1$, and predetermined relative phase $\angle J_1$, wherein $|\angle J_1+\angle J_{-1}-2\times\angle J_0-\pi|=0$ radians, where $F_M$ is a modulation frequency.

* * * * *